United States Patent [19]

O'Connor

[11] Patent Number: 4,913,091

[45] Date of Patent: Apr. 3, 1990

[54] DISPOSABLE LITTER BOX AND PACKAGE

[75] Inventor: James A. O'Connor, 8 Russett La., Ulster Park, N.Y. 12487

[73] Assignee: James A. O'Connor, Ulster Park, N.Y.

[21] Appl. No.: 192,730

[22] Filed: May 11, 1988

[51] Int. Cl.⁴ .............................. A01K 29/00
[52] U.S. Cl. ....................................... 119/1
[58] Field of Search ....................... 119/1, 19

[56] References Cited

U.S. PATENT DOCUMENTS

| | | | |
|---|---|---|---|
| 4,305,544 | 12/1981 | Noonan | 119/1 X |
| 4,627,382 | 12/1986 | Muzzey | 119/1 |
| 4,685,420 | 8/1987 | Stuart | 119/1 |
| 4,711,198 | 12/1987 | Mossbarger | 119/1 |
| 4,763,603 | 8/1988 | Coes | 119/1 |
| 4,776,300 | 10/1988 | Braddock | 119/1 |
| 4,779,566 | 10/1988 | Morris et al. | 119/1 |
| 4,787,335 | 11/1988 | Carlton | 119/1 |
| 4,788,935 | 12/1988 | Bella et al. | 119/1 |
| 4,807,564 | 2/1989 | Soberg et al. | 119/1 |
| 4,813,376 | 3/1989 | Kaufman et al. | 119/1 |

FOREIGN PATENT DOCUMENTS 3500498 5/1986 Fed. Rep. of Germany .......... 119/1

Primary Examiner—Richard J. Apley
Assistant Examiner—Robert W. Bahr

[57] ABSTRACT

An entirely disposable pet litter apparatus including a rectangular box and a resilient bag bonded to the inner walls of the container. A portion of the top wall of the container is removed creating a window to view the contents. The rectangular box can be constructed with corrugated cardboard or plastic. A bag cover and detachable supports installed through slits in the top wall of the container are used to create a fully enclosed pet litter apparatus. The apparatus can contain prepackaged litter.

13 Claims, 7 Drawing Sheets

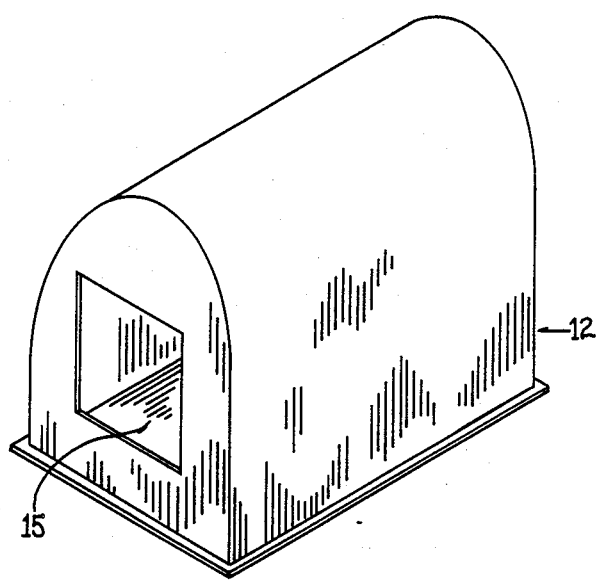
Prior Art
Fig. 3
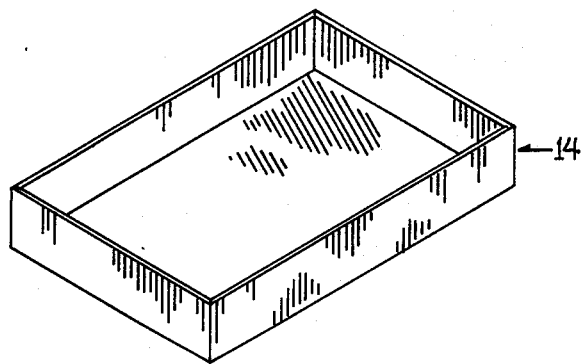
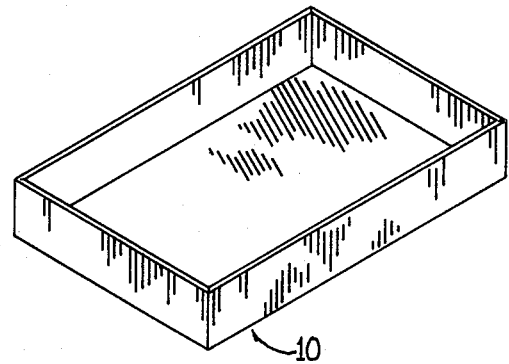

DISPOSABLE LITTER BOX AND PACKAGE

BACKGROUND OF THE INVENTION

Conventional animal waste containers have in general been used to limit animal waste contamination to small areas. In general, these containers have been somewhat rectangular shaped box structures often made of plastic or similar rigid or semi-rigid structures material. Animal waste containers have been used in home applications for animals such as cats and rabbits. these animals have been trained to excrete their waste, urine and feces, into these containers.

FIGS. 1 and 2 depict typical animal waste containers currently used in home applications. Waste container 10 is often made of plastic which makes it semi-rigid and resistant to moisture. The container 10 is generally filled with an absorbant material such as dried clay of processed alfalfa. This material reduces odor through the absorption of moisture. Material of this type loses its ability to absorb moisture after repeated exposure to animal waste. Periodically, when the absorbant material becomes fully contaminated by the waste, it is replaced. A disposable moisture resistant bag 14 is sometimes used to prevent animal waste and waste contaminated absorbant material from coming in contact with the inner walls of the container. The removable rim type lid 11 is used to hold the disposable bag in place and prevent animals from displacing waste and contaminated absorbant material out of the container when it is being used.

FIGS. 3 and 4 depict a variation to common animal waste container 10 with enclosed cover 12 and animal entrance 15. Cover 12 holds the disposable bag 14 in place and prevents waste from being displaced out of the container when it is being used. In addition, said container cover reduces odor produced by the waste by inhibiting free flow of air over the waste.

Reusable animal waste containers, such as those just described have some significant draw backs and disadvantages. Periodically, these containers need to be cleaned and the absorbant material replaced. This task is unpleasant and exposes the individual directly to the waste which is unsanitary and a potential health hazard. Container liners are only partially effective in preventing waste and contaminated absorbant material from contacting the container. Containers with liners often become contaminated with urine. The area surrounding the container frequently becomes contaminated with urine, feces, and contaminated absorbant material. Containers often remain in the same area. Contaminants can permanently damage areas such as the floor surrounding these containers.

Pet owners periodically travel with their animals. Transporting an animal to another location currently can involve considerable effort and a number of unpleasant tasks. The process typically involves the following steps. The waste container is emptied and cleaned. The area surrounding the container is cleaned and the waste disposed. The container is packed together with an unused package of absorbant material and possibly a container liner. When the destination is reached the container is unpacked, the liner inserted, and the container filled with the absorbant material. Filling the container with absorbant material can produce a fine air borne dust that can be unpleasant to inhale. The entire process is repeated on the return leg of the trip.

SUMMARY

The invention provides a low cost disposable container and a convenient absorbant material portable package.

One objective is to provide a container in which the container, waste, and waste contaminated absorbant material can be conveniently discarded after use. With a disposable container there is no longer direct contact with the contaminants as occurs when cleaning a reusable container. The unpleasant tasks and time associated with cleaning a reusable container are eliminated.

Another objective is to construct a container of materials sufficiently low in cost to facilitate disposability.

Another objective is to provide a combined disposable container and package for animal waste absorbant material. In this way it is no longer necessary to purchase the absorbant material separately and refill the container after cleaning.

Another objective is to make travel with pets easier by providing a combined portable disposable container and animal waste absorbant material package. This would eliminate the effort and tasks required to prepare, transport, and set up a reusable container and associated materials.

Another objective is to reduce, virtually eliminate many inadequacies associated with conventional animal waste containers. This includes the necessity to clean the area surrounding the container.

Another objective is to provide additional protection from contaminants to areas surrounding waste containers.

BRIEF DESCRIPTION OF THE DRAWINGS

FIG. 3 is an exploded perspective view of a variation of the typical waste container 10 with removable cover 12 with front opening 15, and with optional bag insert 14.

DESCRIPTION OF THE PREFERRED EMBODIMENT

Figure 8:
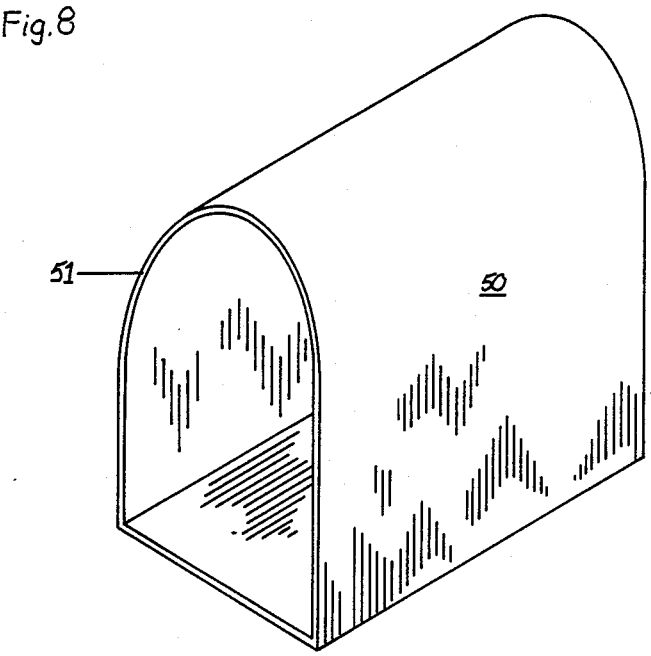
FIG. 8 is an exploded perspective view of the current invention with disposable waste container 40, optional cover supports 43, 44 and optional bag type cover 50.
Figure 8:
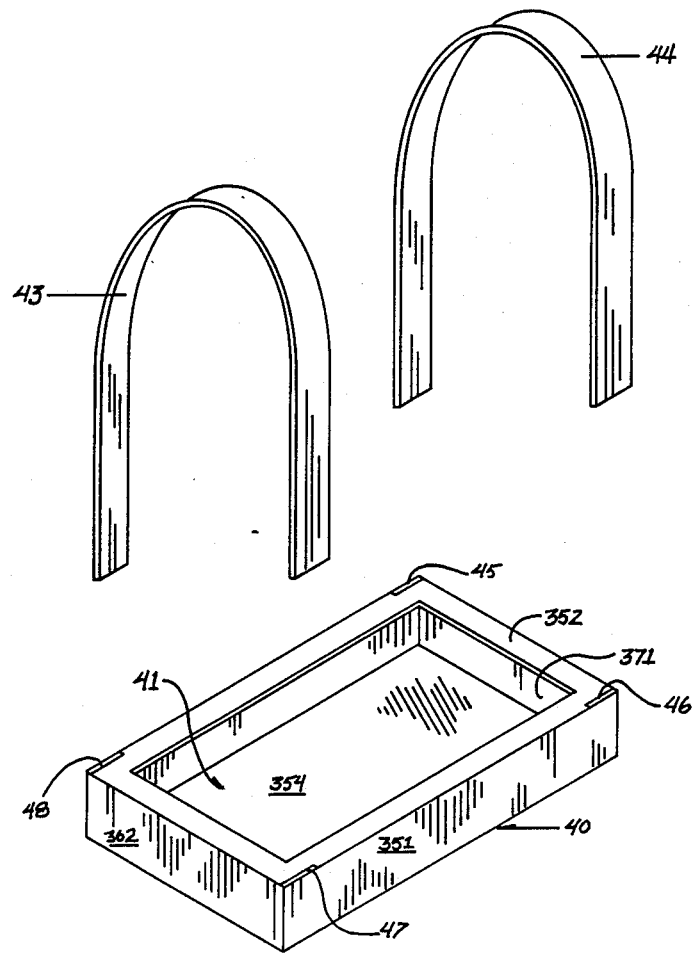
Figure 9:
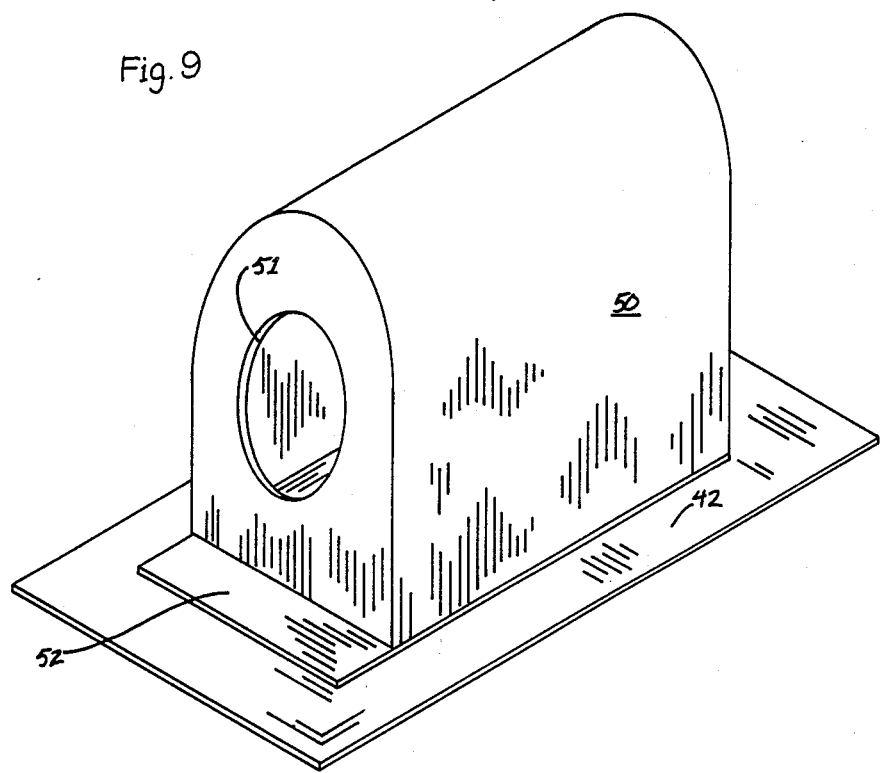
FIG. 9 is a perspective view of the container depicted in FIG. 8 with optional drop cloth 42.

FIGS. 8 and 9 illustrate the present preferred form of the invention which includes a low cost disposable waste container 40 of generally conventional construction of cardboard, corrugated cardboard, or like stiff or semi-stiff material. The inside of this container 41 is made contaminant resistant. This can be achieved by coating the inside of the container 41 with a moisture resistant material such as polyurethane or through the use of a plastic liner made of a material such as polyethylene film.

Optional elongated strap 41 is inserted into holes 45, 48 and optional elongated strap 44 is inserted into holes 46, 47. Straps 41, 44 are used to support the optional bag type cover 50. Optional straps 41, 44 can be made from a flexible plastic, a flexible metallic material, or other flexible material.

Optional surface cover 42 can be used to provide additional protection from contaminants. Said cover could be made from flexible plastic or other moisture resistant flexible material. Surface cover 42 would also provide additional protection to the areas surrounding the conventional reusable waste containers.

Front flap 52, which is attached to bag cover 50, could also be used to provide additional protection to the area surrounding the container.

Optional bag type cover 50 is made of moisture and contaminant resistant material such as polyethylene film or other such material. Bag cover 50 is pulled under floor section 354, around side sections 361, 362 and over supports 43, 44. There are no restrictions on the dimensions of bag type cover 50 except that it must be large enough to allow it to be pulled over and around the container and supports. By making the dimensions of the cover roughly the same proportions of the container with support straps a secure fit would be ensured and the appearance would naturally be more aesthetically pleasing. Functionally however there is no additional dimensional restriction. A common plastic trash bag, of sufficient size, would be suitable as a bag type cover and indeed would provide additional cost benefits since they are currently readily available.

Section 51 extends around the entire front entry of the bag type cover 50. Section 51 can be composed of a flexible or elastic string shaped material that would exert a force over the bag cover pulling it tightly over the container and supports. Some ordinary plastic trash bags in existence currently have self contained plastic tie straps that would be suitable in this application.

Figure 6:
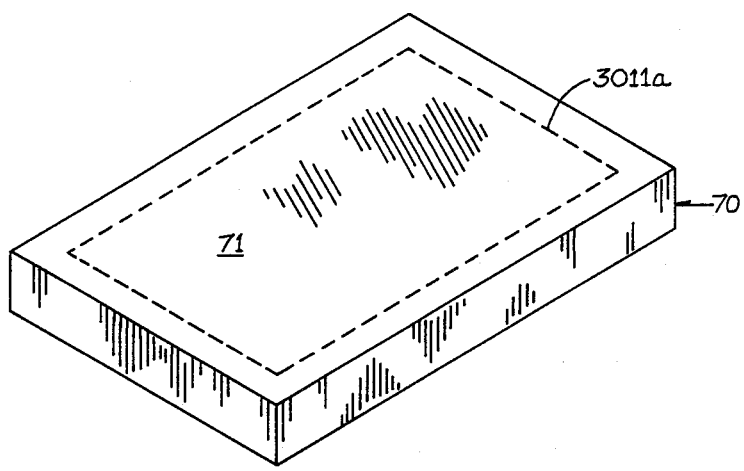
FIG. 6 is an exploded perspective view of the disposable waste container 40 prior to full assembly with an inflated bag insert 70 that contains animal waste absorbant material.
Figure 6:
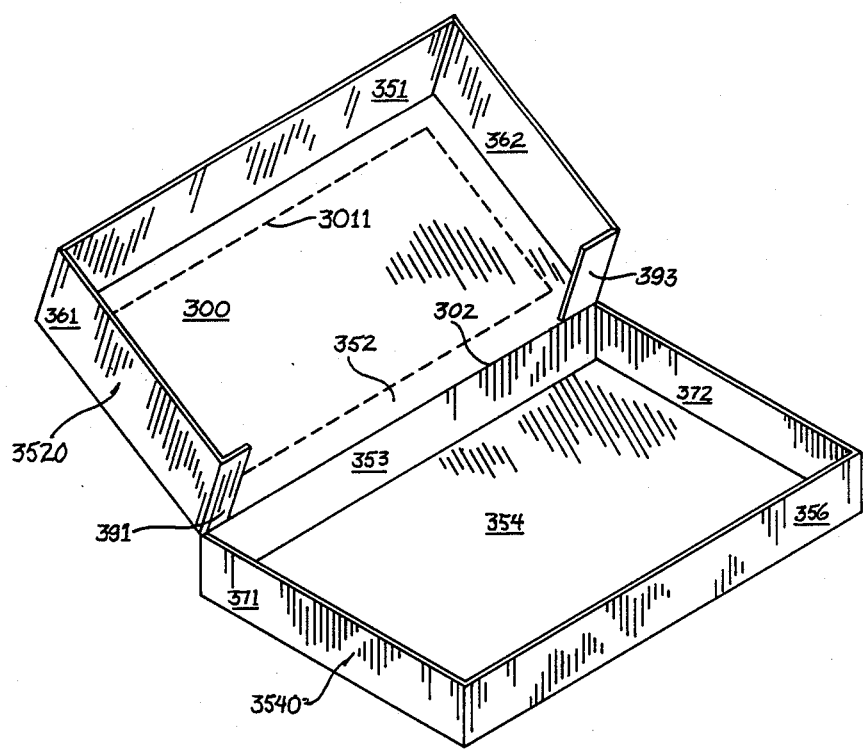
Figure 7:
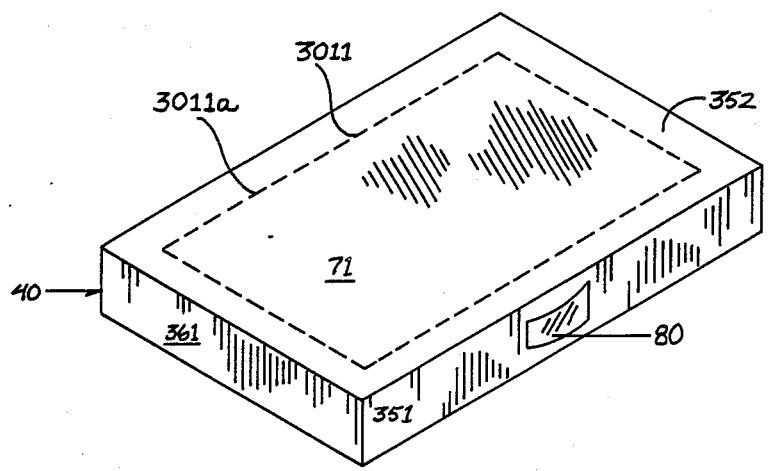
FIG. 7 is a perspective view of the container 40 depicted in FIG. 6.

FIGS. 6, 7 illustrate one example of a combination disposable waste container and absorbant material portable package. Container 40 can be used as a economical portable package for animal waste absorbant material such a dried clay. One way this might be accomplished is by using a sealed bag or a sealed air tight inflatable bag 70 which would be filled with animal waste absorbant material. The air tight fully inflated bag 70 would then be placed into container 40 on top of floor section 354 and in between wall sections 356, 372, 353, 371 which comprise the bottom section 3540. Bag 70 could be secured to section 3540 with a bonding substance such as glue.

Top section 352 together with wall sections 362, 351, 361 comprise lid section 3520. Lid section 3520 would be folded over the bottom section 3540 and sealed bag 70 about foldline 302. Lid section 3520 could be secured to bottom section 3540 and sealed bag 70 with a bonding substance such as glue. External side walls 362, 351, 361 are placed outside internal side walls 372, 356, 371. Front sections 393, 391 can be placed outside wall section 353 or removed.

Top wall section 71 of sealed bag 70 could be made of a transparent or semi-transparent material such as a polyethylene film. In this form section 300 outline by boarder line 3011 could be removed with a knife, razor, scissors or other such device or method. A pull tab method similar to that used to remove the cellophane on most cigarette packages could also be use where a string like material is imbedded in the plastic. This would leave the remainder of bag 70 as a contaminant resistent layer in the container.

Sealed air-tight inflated bag 70 also would provide additional support to the container walls, top, and floor due to the air pressure in the bag. This would permit the container to be constructed with a less rigid, light weight, and less expensive material.

In this form and in conjunction with carrying handle 80 the package is easily and conveniently transported. The waste disposal and cleaning required to prepare a reusable container for transport is eliminated.

Figure 1:
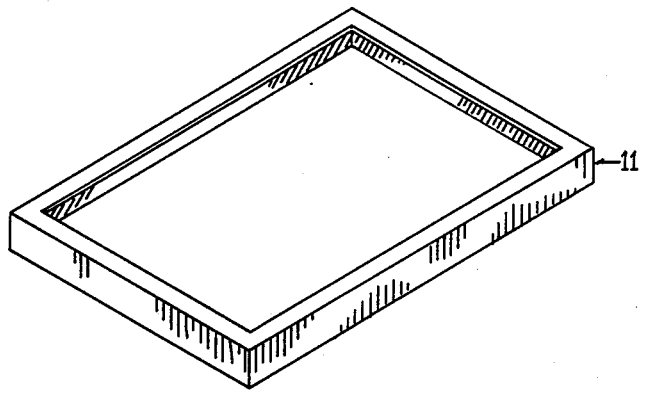
FIG. 1 is an exploded perspective view of a typical animal waste container 10 currently available for home use with removable rim 11 and optional bag insert 14.
Figure 1:
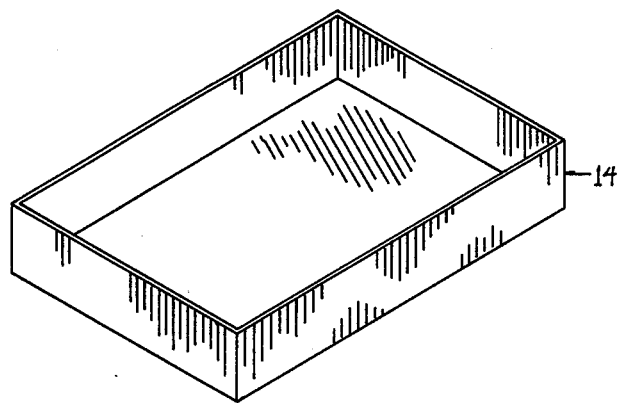
Figure 1:
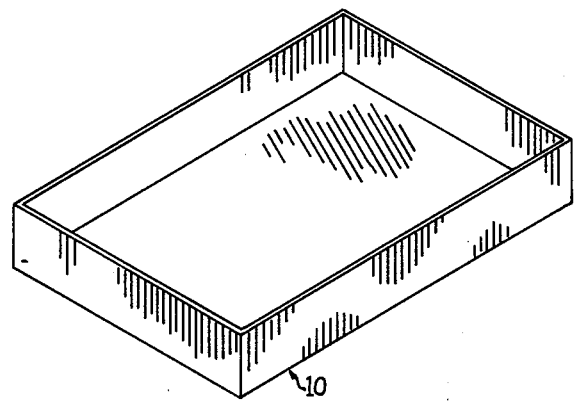
Figure 2:
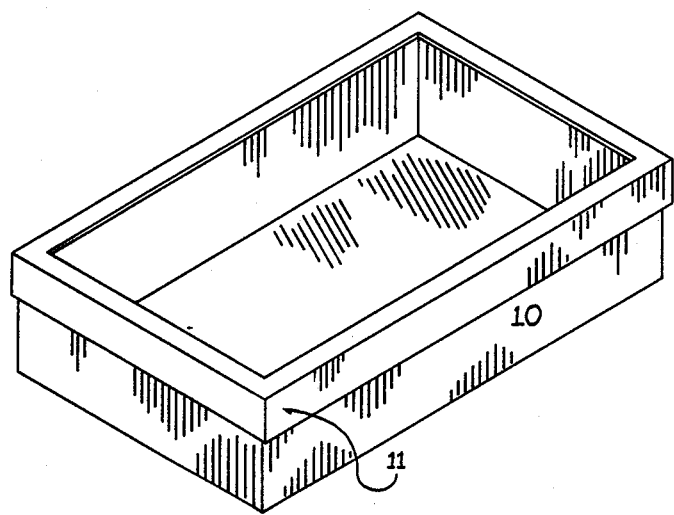
FIG. 2 is a perspective view of the container depicted in FIG. 1
Figure 4:
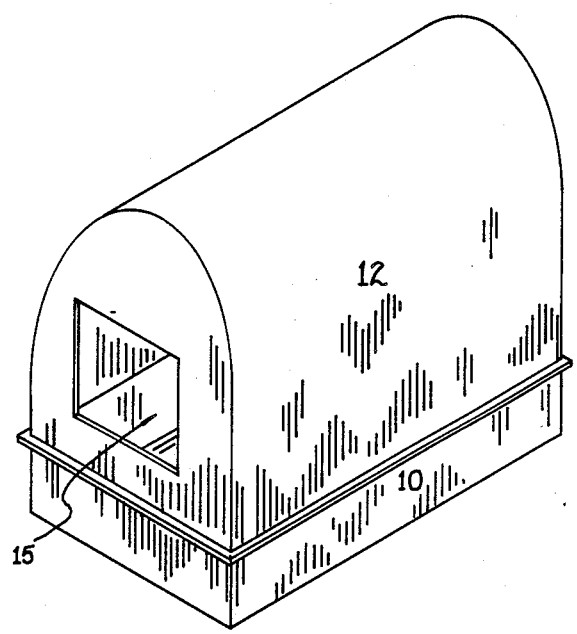
FIG. 4 is a perspective view of the container depicted in FIG. 3
Figure 5:
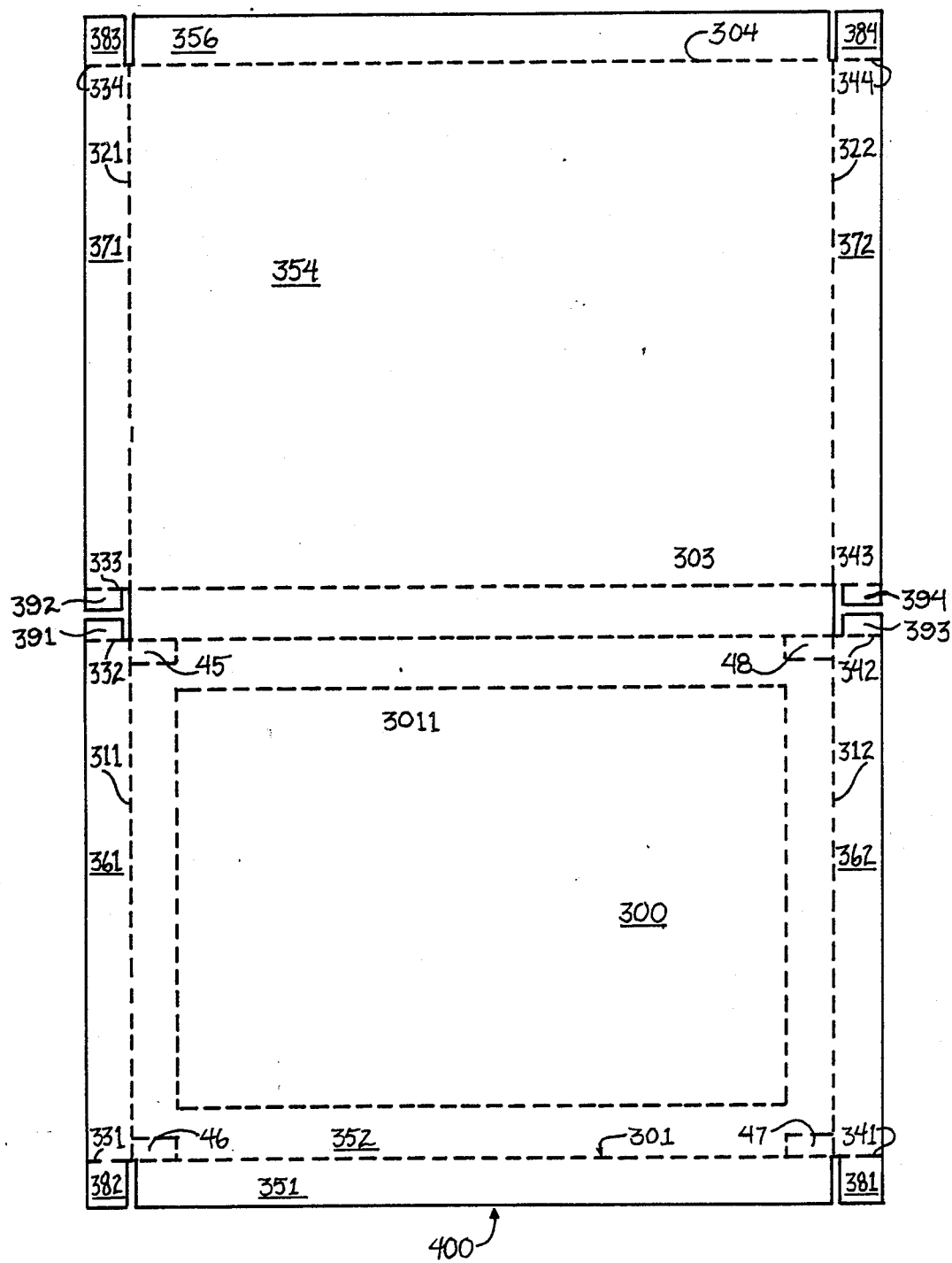
FIG. 5 is a top plan view of a blank 400 from which the disposable waste container 40 can be made.

The container 40 can be constructed from the use of blank 400 made of a material such as cardboard as depicted in FIG. 5. Use of a blank facilitates storage and shipping. When desired, the container can be readily assembled for use in a manner well known in the art. Blank 400 is just one example of many possible methods for constructing a device with the same desirable attributes as container 40. This example is offered only in the interests of being complete and in no way intended on being limiting.

Referring now in detail to the drawings, numeral 40 designates an assembly embodying the invention which may be constructed from a single blank 400 of cardboard or the like stiff or semi-stiff material. Blank 400 comprises a rectangular section 354 which will constitute the bottom wall of the container when assembled. Extending from opposite sides of 354 and foldable upward from said section about parallel side folds 303, 304 are symmetrically opposed sections 353, 356 which constitute side walls of the container.

Extending from opposite sides of 354 and foldable upward from said section about parallel side fold lines 321, 322 are symmetrically disposed sections 371, 372 which constitute the internal side walls of the container. Sections 371, 372 have rear sections 383, 384 connected at fold lines 334, 344 which are fastened to internal side wall 356 during assembly. Sections 371, 372 are rotated upward about fold lines 321, 322 until they are perpendicular to the plane of section 354. Sections 371, 372 have front sections 392, 394 connected at fold lines 333, 343 which are fastened to side wall 353 during assembly. Sections 392, 394 are fastened to the inside or outside of 353 which has been rotated about fold line 303 until perpendicular to the plane of section 354.

Extending from opposite sides of section 352 and foldable upward from said section about parallel side folds 301, 302 are symmetrically disposed sections 351, 353 which constitute sidewalls.

Rectangular section 352 constitutes the top wall of the container when it is assembled. Extending from opposite sides of section 352 and foldable upward from said section about parallel fold lines 311, 312 are symmetrically disposed sections 361, 362 which constitute external side walls of the container. Sections 361, 362 have rear sections 382, 381 connected at fold lines 331, 341 which are fastened to external side wall 351 during assembly. Sections 361, 362 are rotated upward about fold lines 311, 312 until they are perpendicular to the plane of section 352. Sections 382, 381 are fastened to either the inside or outside of section 351 which is rotated upward about fold line 301 until perpendicular to the plane of section 352. Sections 361, 362 have front sections 391, 393 connected at fold lines 332, 342 which are fastened to side wall 353 during assembly. Sections 391,393 are fastened to the inside or outside of section 353 or they may be removed.

Rectangular section 300 is a subsection of top wall 352 outlined by border line 3011. During manufacture or prior to use section 300 is removed.

Border lines 45, 46, 47, 48 designate areas that would be removed when installing supports 43, 44 to be used with the optional bag type cover 50.

Obviously many other modifications and variations of the invention as here in before set forth can be made without departing from the spirit and scope here of.

While there has been here in described the presently preferred form of the invention, it is to be understood that various changes may be made therein within the scope of the appended claims.

What I claim is:

1. A disposable pet litter apparatus comprising:
   a container having a substantially rectangular bottom panel, two oppositely disposed substantially upright peripheral side walls, oppositely disposed substantially upright peripheral front and rear walls, a substantially rectangular top wall with a smaller substantially rectangular generally centrally disposed opening in said top wall, and apertures in said top wall of said container near its corners;
   a moisture resistant, resilient, flexible bag held adjacent the inner walls of said container by an adhesive;
   detachable support members connected to said apertures, said support members extending through said apertures in said top wall and being retained against the inner walls of said container by said resilient, flexible bag, said container and support members forming a frame structure; and,
   a moisture resistant, resilient, flexible external bag cover having an opening at one end thereof and encircling said frame structure.

2. A disposable pet litter apparatus as in claim 1 wherein the container is formed from a single corrugated cardboard blank.

3. A disposable pet litter apparatus as in claim 2 wherein the inside of the container is coated with wax or polyurethane.

4. A disposable pet litter apparatus as in claim 2 wherein the container is paperboard.

5. A disposable pet litter apparatus as in claim 4 wherein the inside of the container is coated with wax or polyurethane.

6. A disposable pet litter apparatus as in claim 1 wherein the container is plastic.

7. A disposable pet litter apparatus as in claim 1 wherein the container includes prepackaged cat litter therein.

8. A disposable pet litter apparatus as in claim 1 wherein the external bag cover is a trash bag usable for the disposal of the apparatus.

9. A disposable pet litter apparatus as in claim 1 further including a moisture resistant drop cloth.

10. A disposable pet litter apparatus as in claim 1 wherein the detachable support members are plastic.

11. A disposable pet litter apparatus as in claim 1 wherein the external bag cover includes drawstrings or an elastic strip about the opening thereof for securing said bag cover around the frame structure.

12. A disposable pet litter apparatus as in claim 8, wherein the bag cover includes flap extension to prevent droppings from contaminating the floor.

13. A disposable pet litter apparatus as in claim 11, wherein the bag cover includes flap extension to prevent droppings from contaminating the floor.

* * * * *